(12) United States Patent
Princell et al.

(10) Patent No.: US 8,371,338 B2
(45) Date of Patent: Feb. 12, 2013

(54) FOAM INSULATION STRUCTURE AND METHOD FOR INSULATING ANNULAR DUCTS

(75) Inventors: Charles M. Princell, Graham, NC (US); Mike Resetar, Hillsborough, NC (US)

(73) Assignee: Armacell Enterprise GmbH, Muenster (DE)

( * ) Notice: Subject to any disclaimer, the term of this patent is extended or adjusted under 35 U.S.C. 154(b) by 817 days.

(21) Appl. No.: 12/562,668

(22) Filed: Sep. 18, 2009

(65) Prior Publication Data
US 2010/0071289 A1    Mar. 25, 2010

Related U.S. Application Data

(60) Provisional application No. 61/099,361, filed on Sep. 23, 2008.

(51) Int. Cl.
*F16L 9/14* (2006.01)
(52) U.S. Cl. ......... 138/149; 138/131; 138/148; 138/139
(58) Field of Classification Search .................. 138/149, 138/148, 131, 140, 137, 143
See application file for complete search history.

(56) References Cited

U.S. PATENT DOCUMENTS

| | | | |
|---|---|---|---|
| 4,219,050 A * | 8/1980 | Hargrave et al. | 138/97 |
| 5,947,158 A | 9/1999 | Gross et al. | |
| 6,964,282 B2 * | 11/2005 | Babineau et al. | 138/149 |
| 7,032,621 B2 * | 4/2006 | Keyes | 138/120 |
| 2010/0212807 A1 * | 8/2010 | Princell et al. | 156/92 |
| 2011/0041475 A1 * | 2/2011 | Hicken et al. | 60/253 |

FOREIGN PATENT DOCUMENTS

| | | |
|---|---|---|
| FR | 2832487 A1 | 5/2003 |
| WO | 2005014258 A | 2/2005 |

OTHER PUBLICATIONS

European Search report in corresponding EP Appln. No. 08015316.6 dated Nov. 11, 2008, 5 pages.

* cited by examiner

*Primary Examiner* — Patrick F Brinson
(74) *Attorney, Agent, or Firm* — Rothwell, Figg, Ernst & Manbeck, P.C.

(57) ABSTRACT

An annular duct insulation structure includes a substantially rigid annular insulation-retaining insert having a substantially cylindrical outer surface. A viscoelastic insulation foam layer is disposed around the substantially cylindrical outer surface of the insert so as to result in a composite insulation structure of the foam layer and the insert. The foam layer is formed of at least one of (A) a compressed open-cell foam layer or (B) a compressed closed-cell foam layer in which at least a portion of the closed cells has been opened, wherein the foam layer has been compressed sufficiently to permit the composite insulation structure to be slipped into an annular duct without substantial friction, and wherein the foam layer decompresses so as to substantially fill a void between an inner surface of the duct and an outer surface of the foam layer of the composite insulation structure.

13 Claims, 2 Drawing Sheets

FOAM INSULATION STRUCTURE AND METHOD FOR INSULATING ANNULAR DUCTS

CROSS REFERENCE TO RELATED APPLICATION(S)

This application claims priority from U.S. Provisional Patent Application No. 61/099,361, filed Sep. 23, 2008, the contents of which are incorporated herein by reference in its entirety.

BACKGROUND OF THE INVENTION

1. Field of the Invention

This invention relates to insulation structures and methods for the insulation of interior surfaces of annular ducts.

2. Description of the Background Art

Current application of low density thermal and/or acoustic insulation to the interior surface of annular duct systems typically requires a three component structure: (1) annular duct shell, (2) low density fiber, such as fiberglass, and (3) annular (perforated or solid) insulation retaining insert. (see FIG. 5). The purpose of the retaining insert is to hold the drapable insulation material against the interior wall of the annular duct. Fiberglass insulation materials do not have sufficient structural integrity to maintain an unaided annular shape, and cannot be installed in annular ducts without the use of strong adhesives, mechanical fasteners and/or annular retaining inserts. The use of limited open time contact adhesives is prohibitive due to health hazards and surface area application limits associated with short setup time.

Prior attempts to replace fiberglass with closed cell elastomer and polymer foams have all resulted in failure. Closed cell foams are extremely difficult to install between the duct shell and insulation retaining insert due to the magnitude of the resulting insertion force.

There remains a need in the art for improved insulation structures and methods for the insulation of interior surfaces of annular ducts.

SUMMARY OF THE INVENTION

In accordance with one embodiment of the invention, an annular duct insulation structure comprises a substantially rigid annular insulation-retaining insert having a substantially cylindrical outer surface. A viscoelastic insulation foam layer is disposed around the substantially cylindrical outer surface of the insert so as to result in a composite insulation structure of the foam layer and the insert. The foam layer comprises at least one of (A) a compressed open-cell foam layer or (B) a compressed closed-cell foam layer in which at least a portion of the closed cells has been opened. The foam layer has been compressed sufficiently to permit the composite insulation structure to be slipped into an annular duct without substantial friction. Thereafter, the foam layer decompresses so as to substantially fill a void between an inner surface of the duct and an outer surface of the foam layer of the composite insulation structure. The invention further relates to an insulated annular duct assembly formed with the insulation structure of the invention. Also included in the invention are methods for forming an annular duct insulation structure, and for forming an insulated annular duct assembly.

DETAILED DESCRIPTION OF THE INVENTION

The present invention utilizes an annular duct insulation foam material that demonstrates viscoelastic properties. In preferred embodiments, the foam insulation material is low-density. According to one embodiment, the viscoelastic foam materials of the present invention can be pre-compressed and installed on an insulation retaining insert that can easily be installed inside an annular duct.

Viscoelastic foam layers for use in accordance with one embodiment of the present invention have an open-cell foam matrix structure. The open-cell structure can be produced via by any suitable method, such as chemical reaction during extrusion.

In an alternative embodiment, a viscoelastic foam layer in accordance with the present invention is formed from a closed-cell foam in which at least a portion of the closed cells are opened, e.g., by mechanically compressing and fracturing the cell walls, resulting in easy passage of air between the fractured opened cells.

The viscoelastic behavior of foams which are utilized in accordance with the present invention allow the foams to be installed on an outer insulation retaining insert and compressed to allow easy insertion into a duct. Over a short period of time thereafter, the foam recovers or decompresses, substantially completely filling the void between the inner surface of the duct and the outer surface of the foam layer outside the insulation-retaining insert.

The present invention allows the insulation of non-fiber elastomeric or polymeric foams in an annular duct, thereby eliminating the potential for air-born fibers to be introduced into a habitable environment.

Figure 1:
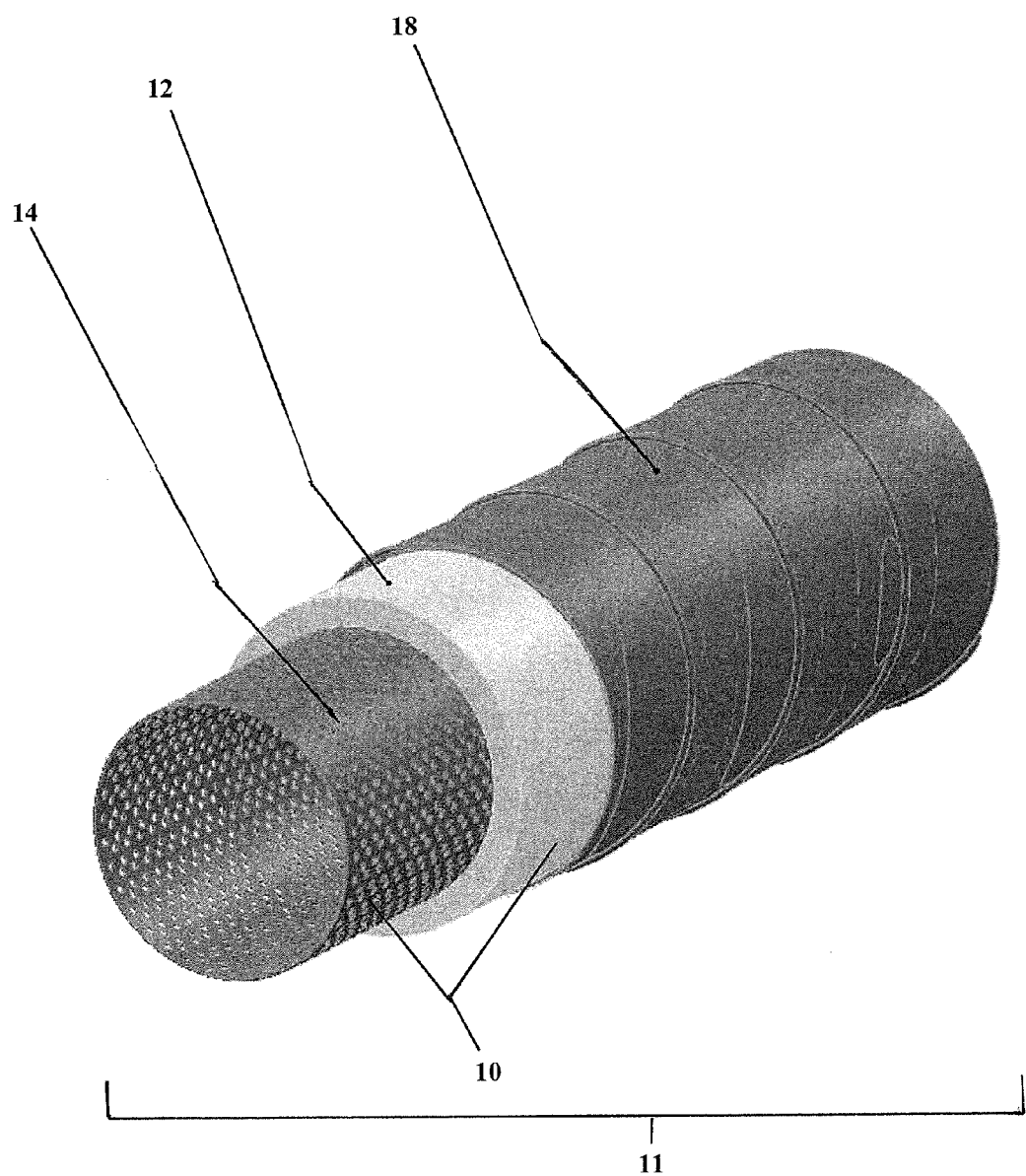
FIG. 1 is a perspective view of one embodiment showing an annular duct assembly of the invention including the inventive insulation structure.

As illustrated in FIG. 1 the composite annular duct insulation structure 10 of the invention comprises a first outer layer 12 of insulation material and a retaining insert 14 providing structural support. Insert 14 is a substantially rigid annular insulation-retaining insert having a substantially cylindrical outer surface. Insert 14 can be an annular metal sheet, which can be perforated or solid, for use as an insulation-retaining insert.

The insulation layer 12 can be formed from any suitable viscoelastic material for insulating ducts, such as elastomeric foams, thermoplastic foams, thermo-set polymer foams.

In certain embodiments, viscoelastic open- or closed-cell type elastomeric or polymeric foams, such as cross-linked foams, are used for the insulation layer 12. Any suitable viscoelastic elastomeric foam materials can be used, including but not limited to, Ethylene-propylene (EPDM), Nitrile (NBR), Styrene-butadiene (SBR), Polybutadiene (BR), Natural rubber (NR), Chloroprene (CR), Butyl and Halobutyl (IIR, BIIR, CIIR), Silicone (MQ), Blends with compatible rubbers, e.g. Styrene-butadiene and polybutadiene, Blends with compatible resins, e.g., Nitrile and polyvinyl chloride.

Suitable viscoelastic thermoplastic foams for the insulation layer 12 include cross-linked polyethylene, non-cross-linked polyethylene, polypropylene, polyethylene terephthalate, or polyurethane.

The invention further relates to an insulated annular duct assembly 11 formed with the insulation structure 10 (comprising foam layer 12 and retaining insert 14) wherein the insulation structure 10 is within duct 18 and wherein the foam layer has decompressed so as to substantially fill a void between the inner surface of duct 18 and an outer surface of insulation foam layer 12 of the composite insulation structure 10.

The foam insulation layer 12 can be easily cut to meet the dimensional requirements of a wide range of duct sizes.

In certain embodiments, the viscoelastic insulation foam layer is compressed at least about 1%, 2%, 3%, 4%, 5%, 6%, 7%, 8%, 9%, 10%, 11%, 12%, 13%, 14%, 15%, or at least about 20%, 25%, 30%, 35%, 40%, 45%, or 50%, prior to insertion into the duct. After insertion into the duct, the foam layer recovers or decompresses so as to substantially completely fill the void between the duct and the outer surface of the foam.

The insulation layer thickness may be from about 0.25 inch to 5 inches, or from about 0.5 inch to 3 inches.

In one embodiment, the annular duct 14 is formed from a spiral wound, and seam welded metal, such as aluminum, galvanized steel, or tin.

The retaining insert thickness may be from about 0.02 inch to 0.5 inch, or from about 0.05 inch to 0.375 inch.

Figure 2:
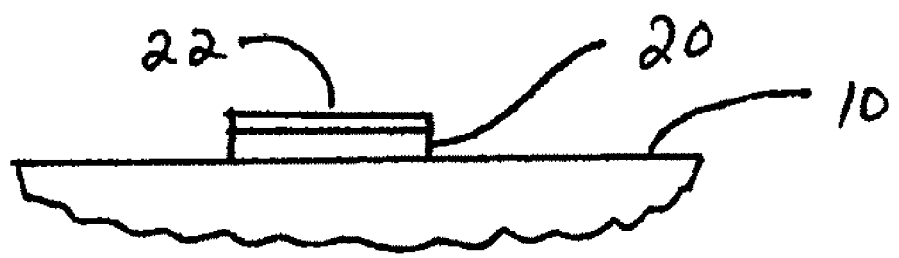
FIG. 2 is a schematic view of one embodiment showing adhesive strips.

In another embodiment, the composite annular duct insulation structure 10 can be fixed to the exterior annular wall of a retaining sleeve 18 using adhesive strips 20 disposed on the outer layer of the composite duct insulation structure (see FIG. 2). The adhesive strips 20 may be contact- or pressure-sensitive adhesive, preferably hotmelt pressure sensitive adhesive, covered by release liners 22. The adhesive may be acrylic hydrocarbon solvent-based or water-based. After the composite annular duct insulation structure 10 is in position, the release liners 22 are peeled off to expose an adhesive surface on the adhesive strips 20 on the outer layer of the composite duct insulation structure 10. Thus, this adhesive surface 20 of the composite duct insulation structure 10 can be contacted to the interior wall of an annular duct 18 to adhere the composite insulation to the duct wall. According to this embodiment, the viscoelastic foam insulation system can be fixed to the interior duct surface by adhesive strips protected by a release liner, pre-installed on the exterior surface of the composite insulation system, prior to duct installation. After the composite insulation system is in position, the release liner can be removed, allowing the adhesive surface to make contact with the interior wall of the annular duct being insulated.

While the composite insulation structure 10 of FIG. 1 only shows one insulation layer 12 and one insert retaining layer 14, additional layers and coatings may be included in the composite insulation structure.

According to one embodiment, a method of the invention comprises providing a substantially rigid annular insulation-retaining insert having a substantially cylindrical outer surface. A viscoelastic insulation foam layer is provided, the foam layer comprising a compressed open-cell foam layer or compressed closed-cell foam layer in which at least a portion of the closed-cells have been opened. The foam layer is disposed or positioned around the substantially cylindrical outer surface of the insert so as to form a composite annular duct insulation structure comprising the foam layer and the insert. The foam layer may be compressed prior to or after being disposed or positioned around the substantially cylindrical outer surface of the insert. The foam layer is compressed sufficiently to permit the composite insulation structure to be slipped into an annular duct without substantial friction. After insertion into the duct, the foam layer decompresses so as to substantially fill a void between an inner surface of the duct and an outer surface of the foam layer of the composite insulation structure.

In still a further method of the invention, a composite annular duct insulation structure is provided, with the compressed foam layer disposed or positioned around the annular insulation-retaining insert. The composite annular duct insulation structure is inserted into an annular duct. Thereafter, the foam layer decompresses so as to substantially fill a void between an inner surface of the duct and the outer surface of the foam layer.

In describing the invention, certain embodiments have been used to describe the invention. However, the invention is not limited to these embodiments as other embodiments of the present invention will readily occur to those skilled in the art after reading this specification.

We claim:

1. An composite annular duct insulation structure, comprising:
   a substantially rigid annular insulation-retaining insert having a substantially cylindrical outer surface;
   a viscoelastic insulation foam layer, the foam layer comprising (A) a compressed open-cell foam layer or (B) a compressed closed-cell foam layer in which a portion of the closed cells has been opened, said foam layer being disposed around said substantially cylindrical outer surface of said insert so as to result in a composite annular duct insulation structure including the foam layer and the insert, wherein the foam layer has been compressed sufficiently to permit the composite insulation structure to be slipped into an annular duct without substantial friction, and wherein the foam layer decompresses so as to substantially fill a void between an inner surface of the duct and an outer surface of the foam layer of the composite insulation structure.

2. The insulation structure of claim 1, wherein said foam layer comprises elastomeric foam, thermo plastic foam, or thermo-set polymer foam.

3. The insulation structure of claim 1, wherein said elastomeric foam is cross-linked.

4. The insulation structure of claim 1, wherein said viscoelastic foam is of open-cell type.

5. The insulation structure of claim 1, wherein said viscoelastic foam comprises Ethylene-propylene (EPDM), Nitrile (NBR), Styrene-butadiene (SBR), Polybutadiene (BR), Natural rubber (NR), Chloroprene (CR), Butyl and Halobutyl (IIR, BIIR, CIIR) or Silicone (MQ).

6. The insulation structure of claim 5, wherein said foam further comprises Styrene-butadiene, polybutadiene, Nitrile or polyvinyl chloride.

7. The insulation structure of claim 1, wherein said viscoelastic foam comprises cross-linked polyethylene, non-cross-linked polyethylene, polypropylene, polyethylene terephthalate, or polyurethane.

8. The insulation structure of claim 1, wherein said insert comprises sheet metal selected from the group consisting of aluminum, steel, and tin.

9. The insulation structure of claim 1, wherein said insulation foam layer has a thickness of about 0.05 inch to 5 inches.

10. The insulation structure of claim 1, wherein said insert has a thickness of about 0.02 inch to 1 inch.

11. An insulated annular duct assembly formed with the composite annular duct insulation structure of claim 1, wherein said insulation structure is within said duct, and wherein said foam layer has decompressed so as to substantially fill said void.

12. A method of forming a composite annular duct insulation structure according to claim 1, comprising:
   providing a substantially rigid annular insulation-retaining insert having a substantially cylindrical outer surface;

providing a viscoelastic insulation foam layer, the foam layer comprising at least one of (A) a compressed open-cell foam layer or (B) a compressed closed-cell foam layer in which a portion of the closed cells has been opened;

positioning the foam layer around the substantially cylindrical outer surface of the insert so as to form a composite annular duct insulation structure comprising the foam layer and the insert, the foam layer being compressed either prior to or after being positioned around the outer surface of the insert, wherein the foam layer is compressed sufficiently to permit the composite insulation structure to be slipped into an annular duct without substantial friction, and wherein the foam layer decompresses so as to substantially fill a void between an inner surface of the duct and an outer surface of the foam layer of the composite insulation structure.

13. A method of forming an insulated annular duct assembly, comprising providing a composite annular duct insulation structure as defined in claim 1, and inserting the composite annular duct insulation structure into an annular duct with the foam layer compressed, wherein of the insulation foam layer then decompresses so as to substantially fill a void between an inner surface of the duct and the outer surface of the foam layer.

* * * * *